(12) United States Patent
Watanabe et al.

(10) Patent No.: US 12,049,036 B2
(45) Date of Patent: Jul. 30, 2024

(54) METHOD AND SYSTEM FOR ESTIMATING NORMAL VECTOR TO DIE AND NORMAL VECTOR TO ATTACHMENT

(71) Applicant: Yushin Precision Equipment Co., Ltd., Kyoto (JP)

(72) Inventors: Fumitake Watanabe, Kyoto (JP); Kazutaka Ando, Kyoto (JP)

(73) Assignee: YUSHIN PRECISION EQUIPMENT CO., LTD., Kyoto (JP)

( * ) Notice: Subject to any disclaimer, the term of this patent is extended or adjusted under 35 U.S.C. 154(b) by 736 days.

(21) Appl. No.: 17/215,262

(22) Filed: Mar. 29, 2021

(65) Prior Publication Data
US 2021/0323208 A1  Oct. 21, 2021

(30) Foreign Application Priority Data

Mar. 31, 2020  (JP) .................................. 2020-64837
Mar. 22, 2021  (JP) .................................. 2021-46882

(51) Int. Cl.
*B29C 45/40* (2006.01)
*B29C 33/44* (2006.01)
(Continued)

(52) U.S. Cl.
CPC ........ *B29C 45/7626* (2013.01); *B29C 33/442* (2013.01); *B29C 45/1775* (2013.01); (Continued)

(58) Field of Classification Search
CPC ............ B29C 45/7626; B29C 45/1775; B29C 45/4005; B29C 33/442;
(Continued)

(56) References Cited

U.S. PATENT DOCUMENTS

2014/0197561 A1   7/2014  Pirog
2016/0086343 A1*  3/2016  Namiki .................. G06V 10/60
                                              348/135
(Continued)

FOREIGN PATENT DOCUMENTS

DE        10323308 A1   2/2005
DE     102008019373 A1   1/2009
(Continued)

*Primary Examiner* — Gary Collins
(74) *Attorney, Agent, or Firm* — Rankin, Hill & Clark LLP

(57) ABSTRACT

A method of estimating a normal vector to an attachment mounted to an approach frame of an apparatus for taking out a molded product and a normal vector to a die mounted to a molding machine is provided. A normal vector to a take-out head is estimated through computation using a coordinate/depth determination section and a normal vector computation section on the basis of depth data or coordinate data on three mounting members. Three or more extending portions are specified from the image, the extending portions being each a part of a fixed die or a movable die or a part of a surrounding component and extending in a direction that coincides with the open direction for the dies. A normal vector to the die is estimated through computation on the basis of the depth data or coordinate data on the specified extending portions.

13 Claims, 18 Drawing Sheets

(51) Int. Cl.
*B29C 45/17* (2006.01)
*B29C 45/76* (2006.01)
*G06T 7/50* (2017.01)
*G06T 7/73* (2017.01)

(52) U.S. Cl.
CPC .................. *B29C 45/4005* (2013.01); *B29C 2945/76083* (2013.01); *B29C 2945/76244* (2013.01); *B29C 2945/76418* (2013.01); *B29C 2945/76568* (2013.01); *B29C 2945/76896* (2013.01); *G06T 7/50* (2017.01); *G06T 7/73* (2017.01)

(58) Field of Classification Search
CPC .......... B29C 2945/76083; B29C 2945/76244; B29C 2945/76418; B29C 2945/76568; B29C 2945/76896; G06T 7/50; G06T 7/73

See application file for complete search history.

(56) References Cited

U.S. PATENT DOCUMENTS

| | | | | |
|---|---|---|---|---|
| 2018/0029807 | A1* | 2/2018 | Oono | B25J 15/0633 |
| 2020/0009015 | A1* | 1/2020 | Okuma | A61J 1/16 |
| 2020/0147804 | A1* | 5/2020 | Sugiyama | G06T 7/73 |
| 2022/0390222 | A1* | 12/2022 | Kawakami | G01B 11/16 |

FOREIGN PATENT DOCUMENTS

| | | |
|---|---|---|
| JP | H09-192816 A | 7/1997 |
| JP | 2002-120175 | 4/2002 |

\* cited by examiner

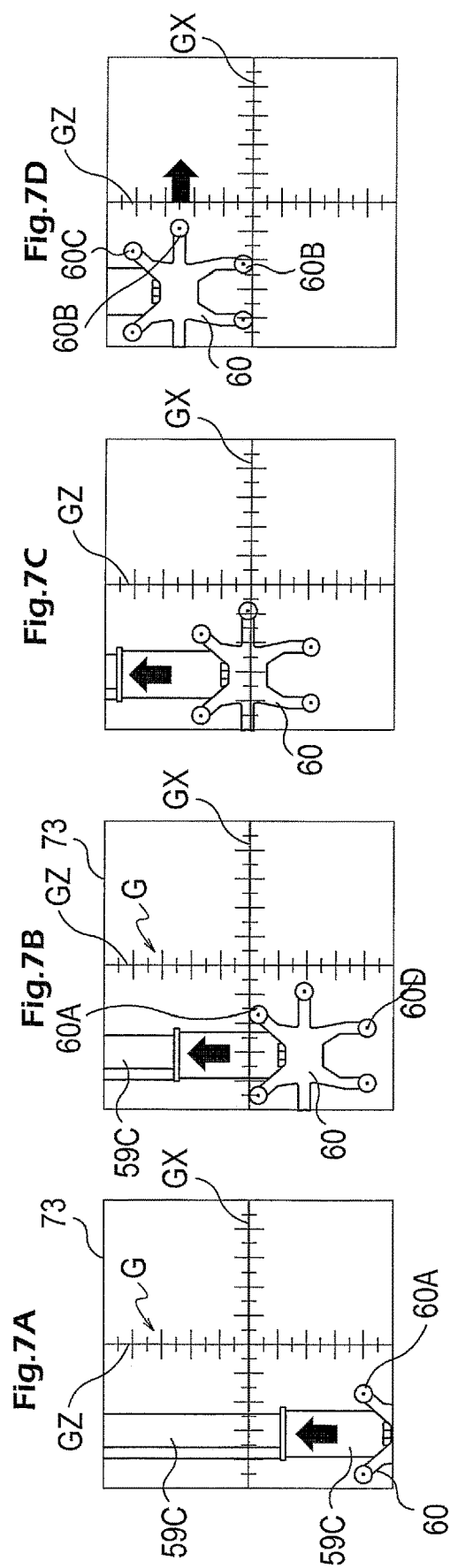

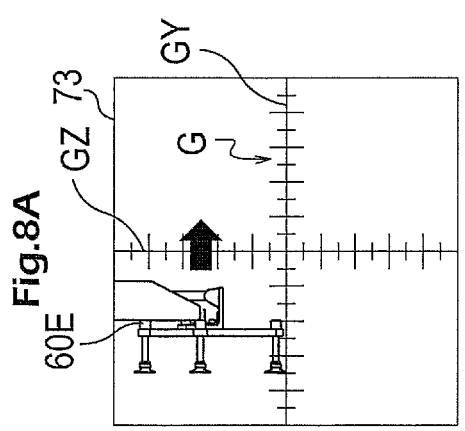
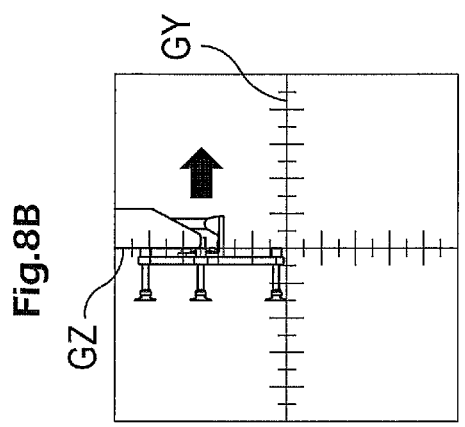
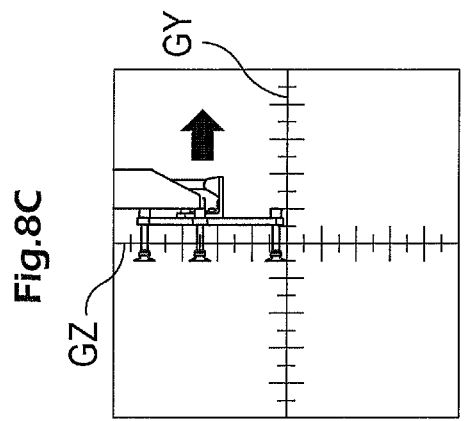
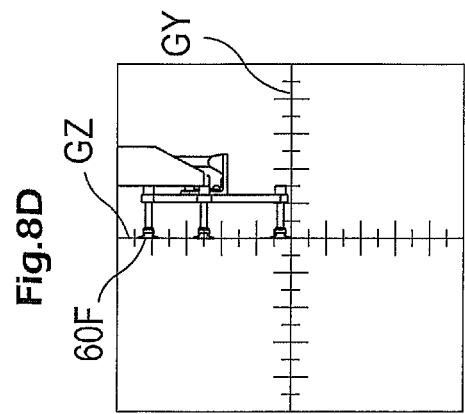
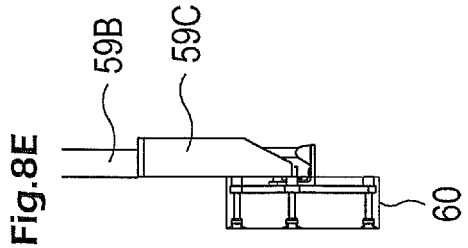

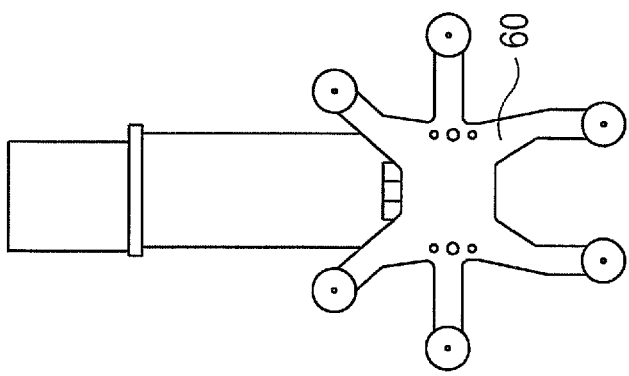
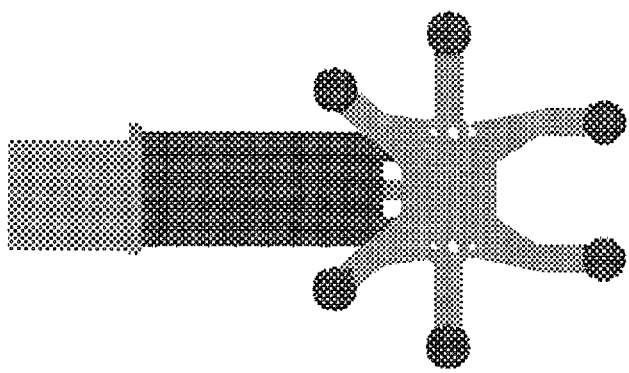
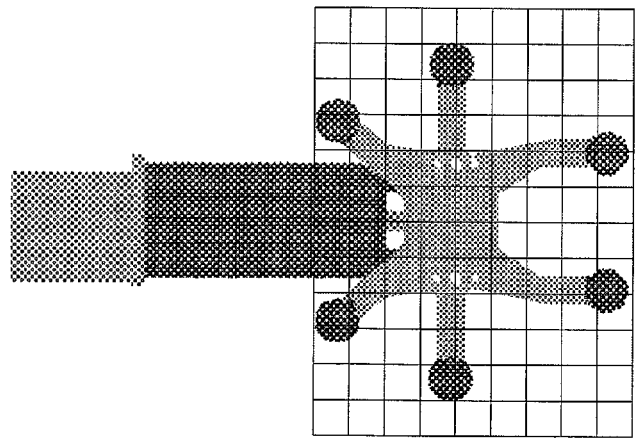
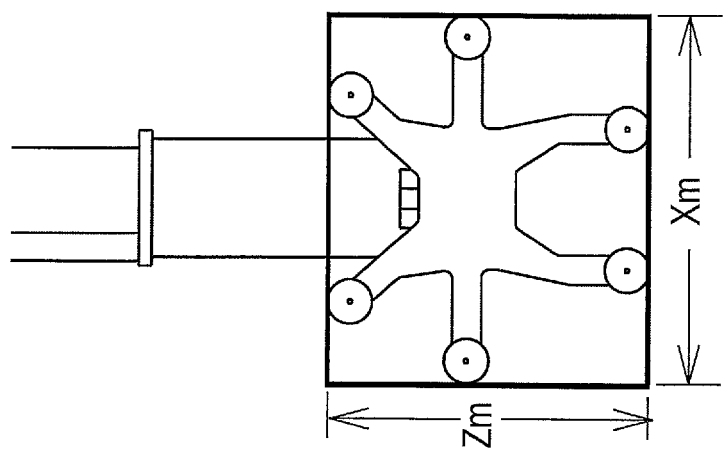

THREE DIMENSIONAL IMAGING DEVICE (ORIGIN O)

METHOD AND SYSTEM FOR ESTIMATING NORMAL VECTOR TO DIE AND NORMAL VECTOR TO ATTACHMENT

TECHNICAL FIELD

The present invention relates to a method and system for estimating a normal vector to an attachment mounted to an approach frame of an apparatus for taking out a molded product and a normal vector to a die mounted to a molding machine.

BACKGROUND ART

Japanese Unexamined Patent Application Publication No. 2002-120175 (Patent Document 1) discloses an invention related to teaching of an apparatus for taking out a molded product. In the related art, when taking out a molded product from a die of a molding machine, an operator performs setting work for a teaching program for programming beforehand the path of an approach frame of the apparatus for taking out a molded product and the posture of a take-out head (attachment) mounted to the approach frame, while moving the take-out head while seeing the relationship between the take-out head and the die such that the take-out head does not collide with the die.

[Patent Document 1] Japanese Unexamined Patent Application Publication No. 2002-120175 (JP2002-120175A)

SUMMARY OF INVENTION

Technical Problem

When the above work is performed, the take-out head occasionally collides with the die to damage the die. This problem is caused by an assumption by the operator that the status of installation of the die in the molding machine and the mounting state of constituent components of the take-out head are invariable at all times. In reality, however, the mounting state of the take-out head is not always constant. Under such circumstances, a high degree of proficiency and a sharp eye are required from the operator to prepare or correct the teaching program such that the take-out head does not collide with the die. If the take-out head is tilted with respect to the die, there is an apprehension that the take-out head contacts the die when the take-out head approaches the die or that the die is damaged when their surfaces are caused to abut against each other. Thus, it is necessary to grasp the tilt between the take-out head and the die, and correct the tilt when the take-out head approaches the die or when their surfaces are caused to abut against each other.

In consideration of automation or precision enhancement of the teaching, it is necessary to know the mounting state of the die and the attachment. The mounting state of the die and the attachment can be recognized by knowing a normal vector to the attachment and a normal vector to the die which is mounted to the molding machine.

It is an object of the present invention to provide a method and system for estimating a normal vector to an attachment mounted to an approach frame of an apparatus for taking out a molded product and a normal vector to a die mounted to a molding machine.

Solution to Problem

The present invention provides a method of estimating a normal vector to an attachment mounted to an approach frame of an apparatus for taking out a molded product and a normal vector to a die mounted to a molding machine. In the present invention, a vector that is perpendicular to respective mating surfaces of a fixed die and a movable die of the die mounted to the molding machine is defined as the normal vector to the die, and a vector that is perpendicular to an imaginary plane that extends in directions in which the approach frame extends and that is parallel to the mating surfaces when the attachment is inserted between the fixed die and the movable die is defined as the normal vector to the attachment. Herein, the movable die includes a common intermediate die interposed between the fixed die and the movable die. The method includes capturing an image including a surrounding component located around the mating surface of the fixed die or the mating surface of the movable die using an imaging device capable of capturing an image including depth data or coordinate data on an object to be captured, specifying three or more extending portions from the image, the extending portions being each a part of the fixed die or the movable die or a part of the surrounding component and extending in a direction that coincides with an open/close direction for the fixed die and the movable die, and estimating the normal vector to the die on the basis of depth data or coordinate data on the specified three or more extending portions. Herein, the "depth data" are data including coordinate data on the position of a dot obtained from dot group data obtained from a three-dimensional imaging device. That is, the depth data refer to information on the direction (specified by angles) of an object as seen from the imaging device (camera) and a distance r when the object is seen from the imaging device. The "coordinate data" refer to a coordinate P (x, y, z) of the object in an xyz orthogonal coordinate system with the imaging device (camera) located at the origin. The depth data can be converted into the coordinate data.

In the present invention, the method also includes capturing an image including three or more mounting members or three or more contact members using an imaging device capable of capturing an image including depth data or coordinate data on an object to be captured, the mounting members extending in a direction that is orthogonal to the approach frame to mount the attachment to the approach frame, and the contact members contacting the molded product, and estimating the normal vector to the attachment on the basis of the depth data or the coordinate data on three of the mounting members or three of the contact members obtained from the image. A three-dimensional imaging device can be used as the imaging device that outputs the depth data and the coordinate data. A known mathematical method can be used as a method of estimating a normal vector from data on three or more points on the basis of the depth data or the coordinate data. With the present invention, image data including depth data or coordinate data obtained from the die and the attachment to be actually used are sampled by the imaging device to estimate a normal vector to the attachment and a normal vector to the die. Thus, normal vectors closely related to the actual mounting state of the die and the attachment can be estimated. Thus, it is possible to easily implement automation of teaching, control for the posture of the attachment, etc.

The present invention may be grasped as a method of estimating a normal vector to a die mounted to a molding machine. Also in this case, a vector that is perpendicular to respective mating surfaces of a fixed die and a movable die of the die mounted to the molding machine is defined as the normal vector to the die. The method includes capturing an image including a surrounding component located around the mating surface of the fixed die or the mating surface of the movable die using an imaging device capable of capturing an image including depth data or coordinate data on an object to be captured. The method also includes specifying three or more extending portions from the image, the extending portions being each apart of the fixed die or the movable die or a part of the surrounding component and extending in a direction that coincides with an open/close direction for the fixed die and the movable die, and estimating the normal vector to the die on the basis of the depth data or the coordinate data on the specified three or more extending portions.

The present invention may also be grasped as a method of estimating a normal vector to an attachment mounted to an approach frame of an apparatus for taking out a molded product. Also in this case, a vector that is perpendicular to an imaginary plane that extends in a direction in which the approach frame extends and that is parallel to mating surfaces when the attachment is inserted between a fixed die and a movable die is defined as the normal vector to the attachment. The method includes capturing an image including three or more mounting members or three or more contact members using an imaging device capable of capturing an image including depth data or coordinate data on an object to be captured, the mounting members extending in a direction that is orthogonal to the approach frame to mount the attachment to the approach frame, and the contact members contacting the molded product. The method also includes estimating the normal vector to the attachment on the basis of the depth data or the coordinate data on three of the mounting members or three of the contact members obtained from the image.

The extending portions may be guide pins of the die, edge surfaces of the fixed die or the movable die, tie bars, etc.

The mounting members may be mounting bolts or edge surfaces of amounting fitting (mounting plate), for example. The contact members may be suction pads, for example.

The imaging devices may each be a three-dimensional imaging device capable of capturing an image including a mating surface of one of the movable die and the fixed die of the die in an open state, and disposed so as to be capable of capturing an image including a take-out surface of the attachment when the attachment is located outside the die.

A posture of an attachment when inserting the attachment into a die can be determined using the normal vector to the die and the normal vector to the attachment estimated using the method of estimating normal vectors according to the present invention, the posture of the attachment being determined so as to take out a molded product in such a posture that the normal vector to the die and the normal vector to the attachment coincide with each other.

In addition, maximum three-dimensional dimensions of an attachment can be accurately measured using the normal vector to the attachment estimated using the method of estimating a normal vector according to the present invention and the image from the imaging device, the normal vector to the attachment being determined as a vector extending along a one-dimensional dimension of three-dimensional dimensions.

Further, the invention can be grasped as a system for estimating a normal vector to an attachment mounted to an approach frame of an apparatus for taking out a molded product and a normal vector to a die mounted to a molding machine. The system according to the present invention includes a processor. A vector that is perpendicular to respective mating surfaces of a fixed die and a movable die of the die mounted to the molding machine is defined as the normal vector to the die, and a vector that is perpendicular to an imaginary plane that extends in directions in which the approach frame extends and that is parallel to the mating surfaces when the attachment is inserted between the fixed die and the movable die is defined as the normal vector to the attachment. The processor is configured to obtain depth data or coordinate data on three or more extending portions specified from an image captured using a first imaging device capable of capturing an image including depth data or coordinate data on an object to be captured, the image including a surrounding component located around the mating surface of the fixed die or the mating surface of the movable die, and the extending portions being each a part of the fixed die or the movable die or a part of the surrounding component and extending in a direction that coincides with an open/close direction for the fixed die and the movable die, and estimate the normal vector to the die on the basis of the depth data or the coordinate data. The processor is further configured to obtain depth data or coordinate data on three mounting members or three contact members specified from an image captured using a second imaging device capable of capturing an image including depth data or coordinate data on an object to be captured, the image including three or more mounting members or three or more contact members, the mounting members extending in a direction that is orthogonal to the approach frame to mount the attachment to the approach frame, and the contact members contacting the molded product, and estimate the normal vector to the attachment on the basis of the depth data or the coordinate data.

BRIEF DESCRIPTION OF DRAWINGS

FIG. 7A through FIG. 7H are image display for illustrating a method according to an embodiment.

FIG. 8A through FIG. 8E are image display for illustrating the method according to the embodiment.

FIGS. 10A to 10C illustrate that maximum dimensions in the X direction and the Z direction are measured using dot group data. FIG. 10D illustrates the maximum dimensions in the X and Z directions.

DESCRIPTION OF EMBODIMENTS

Figure 1:
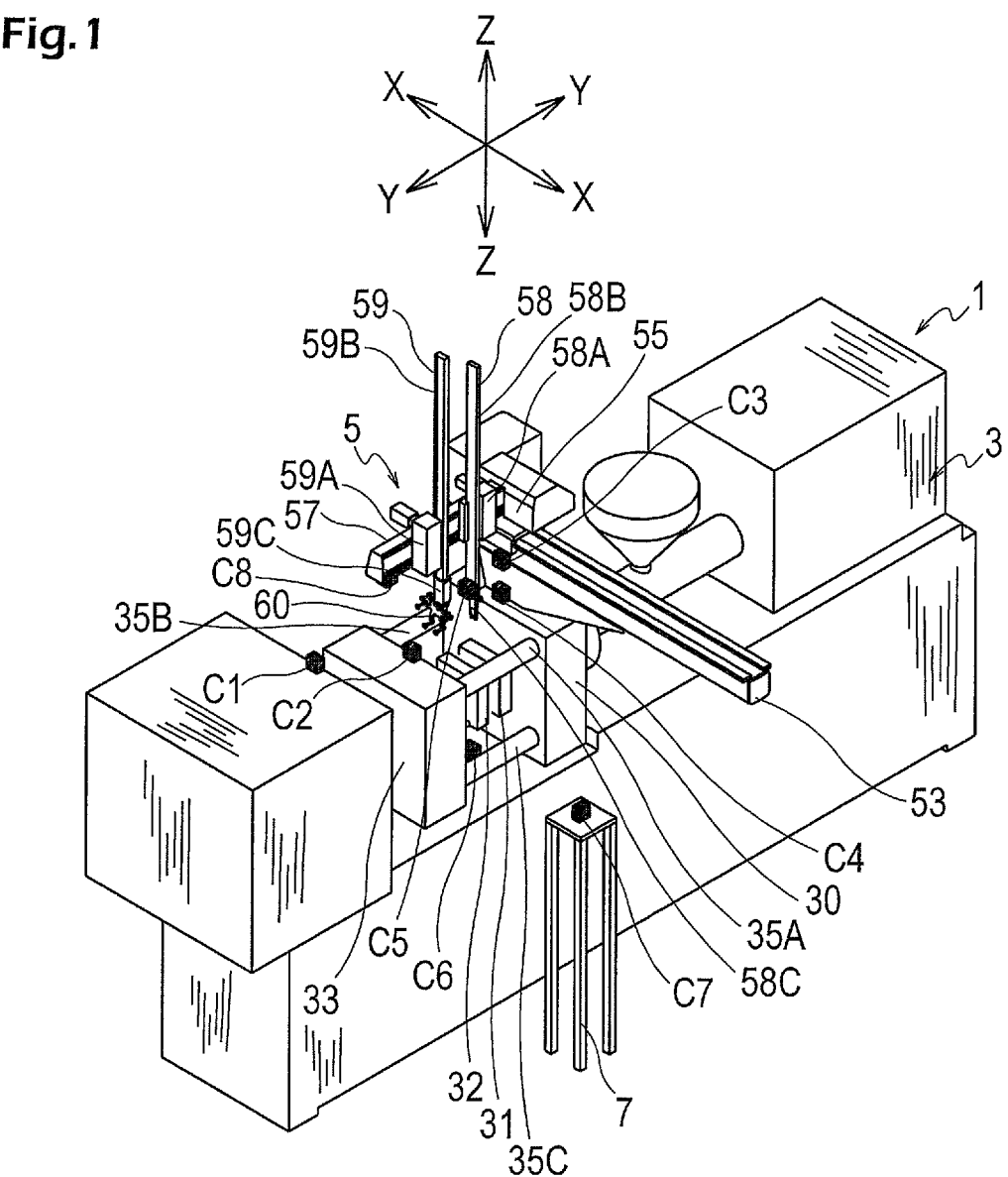
FIG. 1 is a perspective view of a molded product manufacturing system to which a method of estimating normal vectors of the present invention is applicable, the system including an orthogonal three-axis robot which has operation shafts extending in the X direction, the Y direction, and the Z direction and to which a method of measuring the three-dimensional geometry of an attachment according to the present invention is applied.
Figure 2:
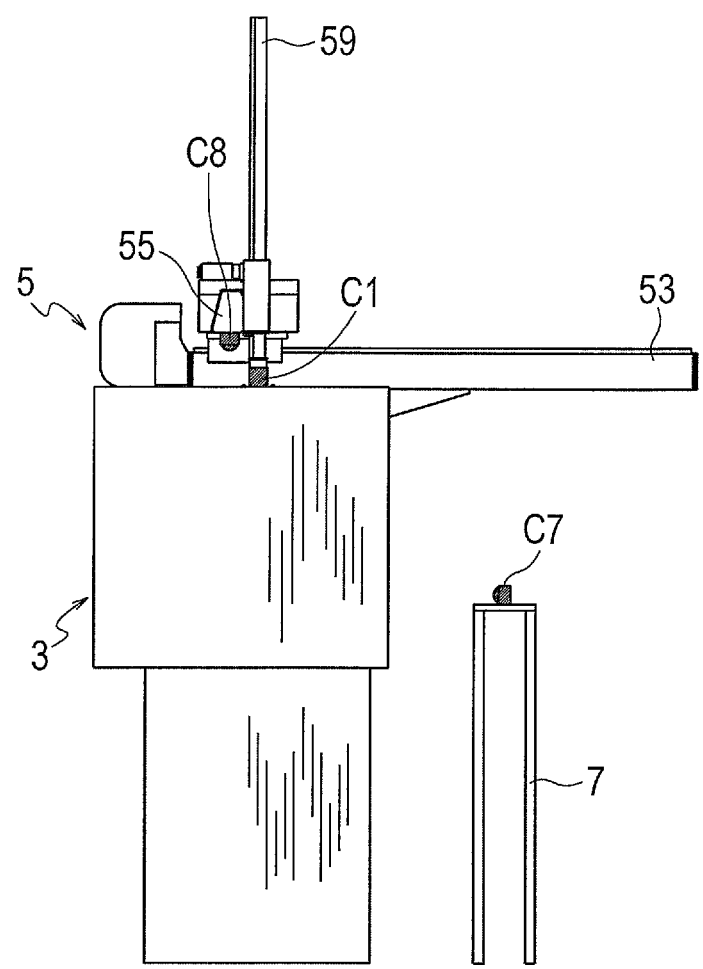
FIG. 2 is a left side view of the molded product manufacturing system.
Figure 3:
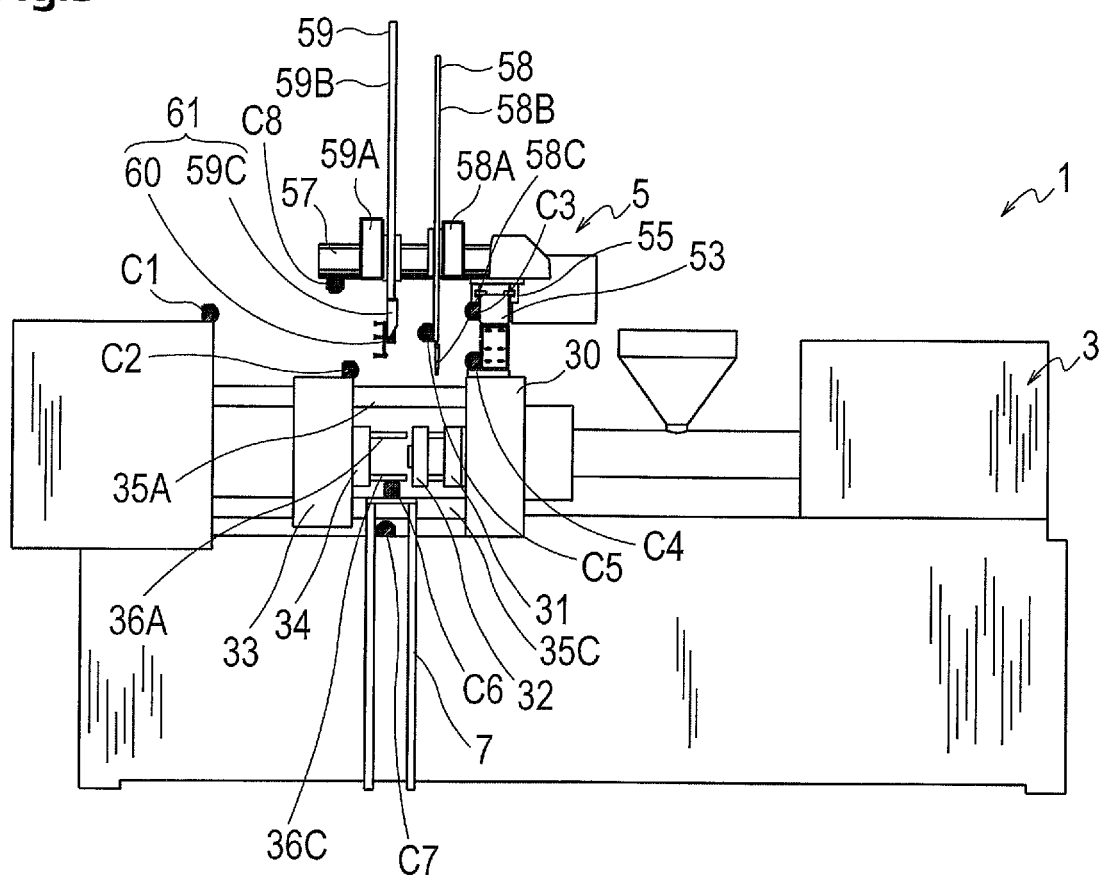
FIG. 3 is a front view of the molded product manufacturing system.
Figure 4:
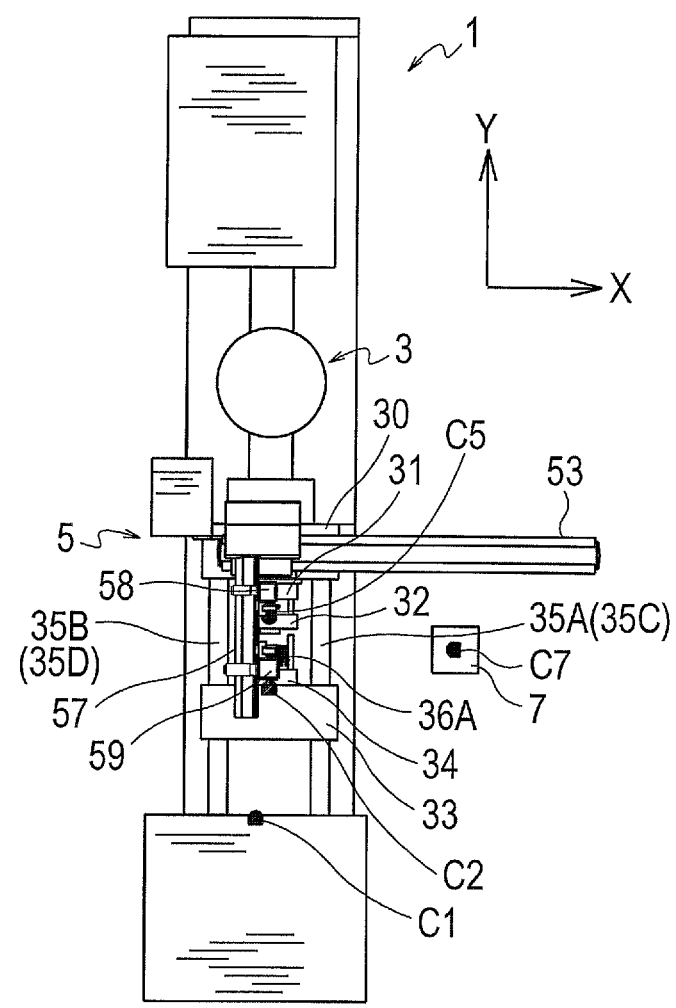
FIG. 4 is a plan view of the molded product manufacturing system.

A normal vector estimation method according to an embodiment of the present invention will be described in detail below with reference to the drawings. FIGS. 1 to 4 are a perspective view, a left side view, a front view, and a plan view, respectively, of a molded product manufacturing system 1 including an orthogonal three-axis robot which has operation shafts extending in the X direction, the Y direction, and the Z direction and to which a normal vector estimation method and a maximum dimension measurement method according to the present invention can be applied. In FIG. 1, the X direction, the Y direction, and the Z direction which are used in the present embodiment are indicated. The molded product manufacturing system 1 is constituted by assembling a molding machine 3 operable to manufacture a resin molded product and an apparatus 5 for taking out a molded product, as the orthogonal three-axis robot. The apparatus 5 is a traverse-type apparatus for taking out a molded product. A base portion of the apparatus 5 is supported by a fixed platen 30 of the resin molding machine 3.

A fixed die 31 and an intermediate die 32 are fixed to the fixed platen 30 of the molding machine 3. A movable die 34 is fixed to a movable platen 33. Four tie bars 35A to 35D are disposed between the fixed platen 30 and the movable platen 33 to guide movement of the movable platen 33. The four tie bars 35A to 35D are disposed at equal intervals. A virtual center line that passes through the center of the four tie bars 35A to 35D passes through the center (nozzle center) of the fixed die 31 and the movable die 34. The fixed die 31, the intermediate die 32, and the movable die 34 are guided by guide pins 36A to 36D. The four guide pins 36A to 36D are also disposed at equal intervals. A virtual center line that passes through the center of the four guide pins 36A to 36D also passes through the center (nozzle center) of the fixed die 31 and the movable die 34.

The apparatus 5 includes a transverse shaft 53, a first transfer body 55, a pull-out shaft 57, a runner elevating unit 58, and a molded product-suctioning elevating unit 59. The transverse shaft 53 has a cantilever beam structure in which the transverse shaft 53 extends in the X direction which is horizontal and orthogonal to the longitudinal direction of the molding machine 3. The first transfer body 55 is supported by the transverse shaft 53, and advanced and retracted in the X direction along the transverse shaft 53 by a drive source formed by an AC servomotor included in a servomechanism. The pull-out shaft 57 is provided on the first transfer body 55 to extend in the Y direction which is parallel to the longitudinal direction of the molding machine. The runner elevating unit 58 and the molded product-suctioning elevating unit 59 are supported on the pull-out shaft 57 to be movable in the Y direction by a drive source formed by an AC servomotor included in the servomechanism. The runner elevating unit 58 is structured to include an elevating frame 58B provided on a travelling body 58A, which is movably supported on the pull-out shaft 57, to be elevated and lowered in the Z direction. A travelling body 59A is driven by an AC servomotor to be moved in the Y direction. The elevating frame 58B is elevated and lowered in the up-down direction (Z direction) by a drive source. The elevating frame 58B includes a chuck 58C that serves as an attachment for holding a runner to be wasted.

The travelling body 59A which is included in the molded product-suctioning elevating unit 59 is driven by an AC servomotor to be moved in the Y direction on the pull-out frame 57. The molded product-suctioning elevating unit 59 includes an elevating frame 59B, a reverse unit 59C, and a take-out head 60. The elevating frame 59B is elevated and lowered in the up-down direction (Z direction) by a drive source. The reverse unit 59C serves as a posture controller to be rotated about the axis of the elevating frame 59B. The take-out head 60 is provided on the reverse unit 59C. In the present embodiment, maximum dimensions of the take-out head 60 as the attachment are measured. In this embodiment, the normal vector to the take-out head 60 is estimated when estimating the maximum dimensions of the take-out head 60 as an attachment.

In the present embodiment, in order to make a trial search for a preferable installation position, eight imaging devices C1 to C8 are installed at various portions of the apparatus 5 and the molding machine 3 and on a stand 7 placed at a side of the molding machine 3. Two-dimensional cameras or three-dimensional cameras are used as the imaging devices C1 to C8. In the present embodiment, a necessary image can be obtained by selecting one of the imaging devices C1 to C8 that provides a preferable image.

Figure 5:
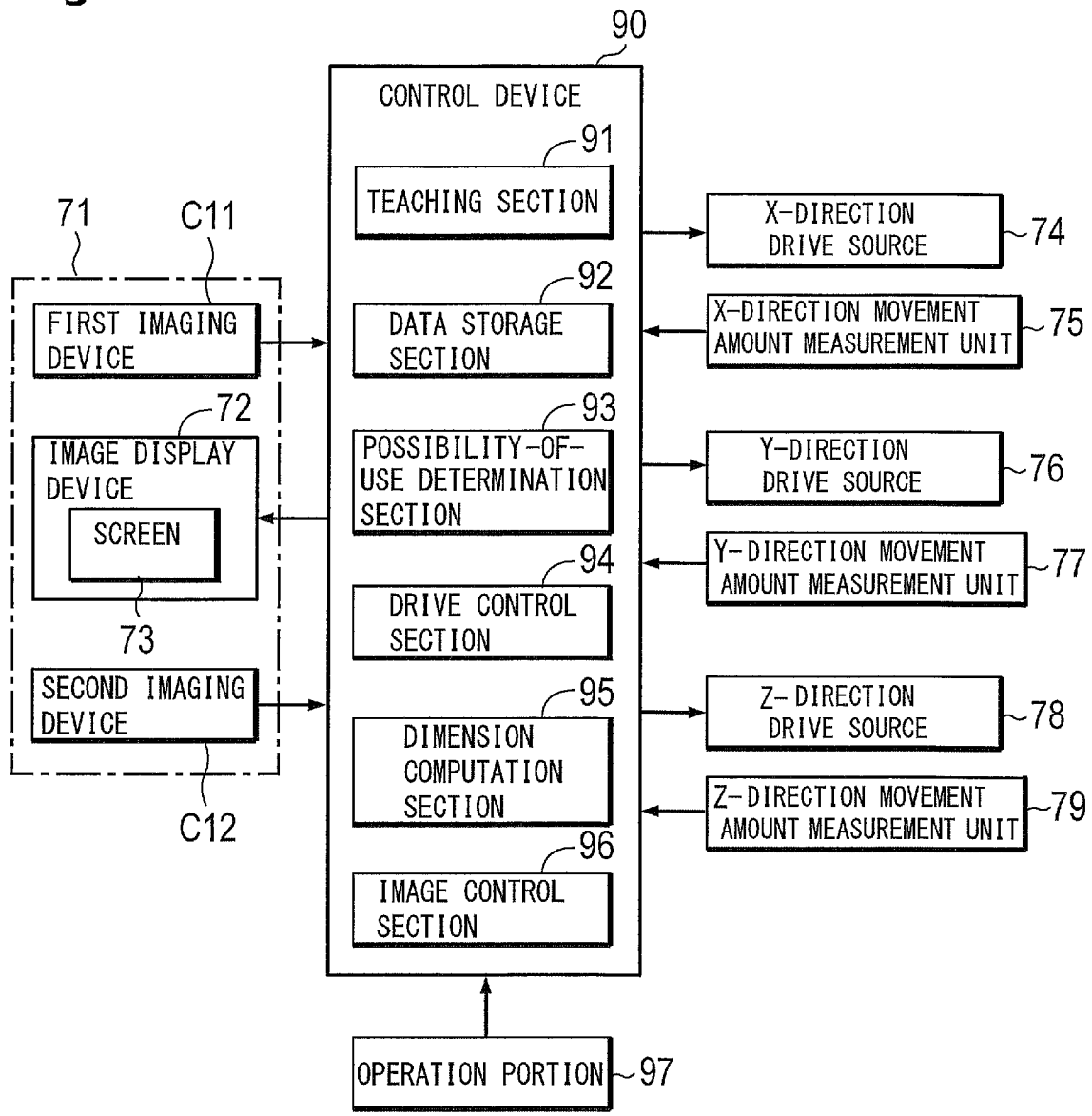
FIG. 5 is a block diagram for showing that the method of estimating normal vectors of the present invention is applied to the system, the block diagram illustrating the configuration of a measurement system constructed in a control system for an apparatus for taking out a molded product, in order to apply the method of measuring the three-dimensional geometry of an attachment.
Figure 6:
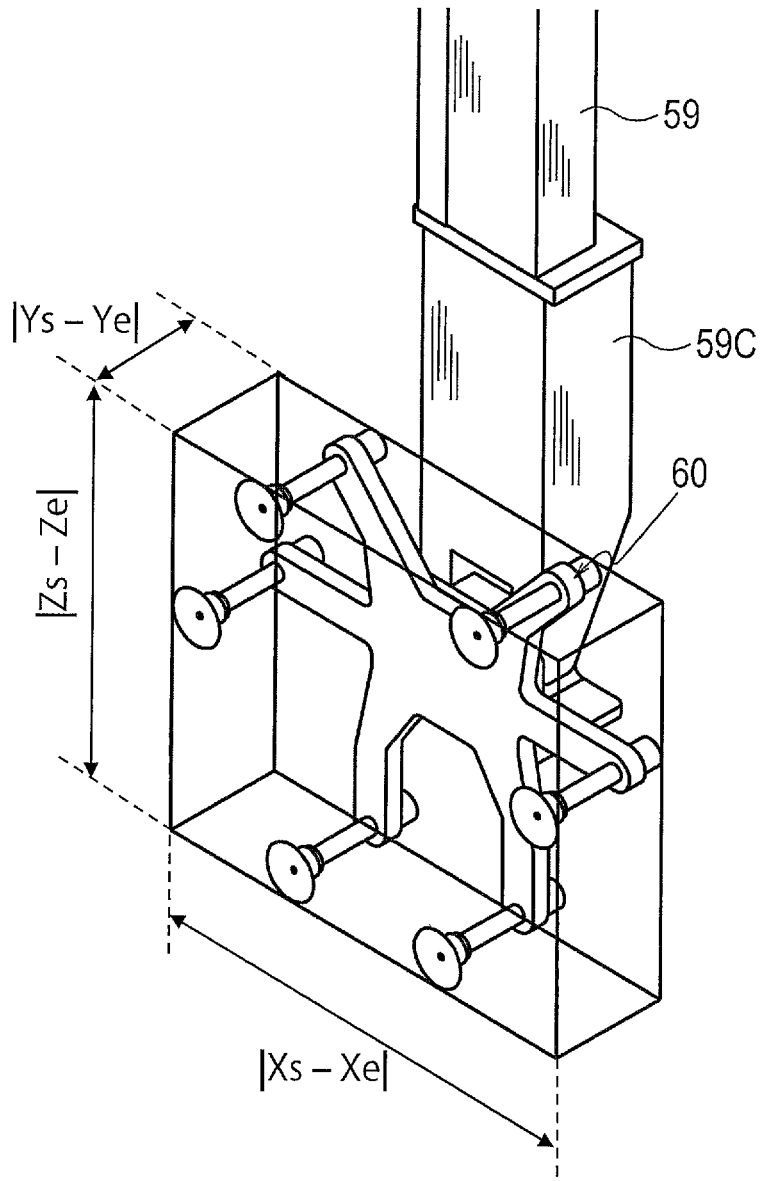
FIG. 6 indicates the maximum dimensions of a take-out head.

FIG. 5 is a block diagram illustrating the configuration of a measurement system constructed in a control system 1 for the apparatus 5, in order to apply the method of measuring the three-dimensional geometry of an attachment according to the present embodiment. FIG. 6 indicates the maximum dimensions of the take-out head 60. FIGS. 7A-8E are image display for illustrating the method according to the present embodiment.

In the method of measuring the maximum dimensions using the method of estimating vectors according to the present embodiment, a maximum dimension of the take-out head 60, as the attachment, in the X direction, a maximum dimension of the take-out head (attachment) 60 in the Y direction, and a maximum dimension of the take-out head (attachment) 60 in the Z direction are measured on the basis of an image of the take-out head 60 captured by at least one of the imaging devices (C1 to C8) before the take-out head 60 starts work with the take-out head 60 being mounted to the elevating frame 59B, as the work frame, of the apparatus 5, as the orthogonal three-axis robot. Preferably, the three-dimensional position coordinate of the at least one imaging device at the time of capturing an image of the take-out head 60, the three-dimensional position coordinate of the take-out head 60 of which an image is captured, the field angle of the imaging device, and the mounting posture of the take-out head 60 to the elevating frame 59B (work frame) are determined so that the image captured by the imaging device includes information needed to measure the three-dimensional geometry of the take-out head 60, depending on the measurement method to be used. As more information such as coordinate information, the field angle of the imaging device, and the mounting posture is available beforehand, computation for measurement of the maximum dimensions on the basis of the image can be facilitated, and computation for correction of the image data on the basis of the difference in the mounting position and the mounting posture of the imaging device can be reduced.

Then, the method of estimating normal vector to attachment according to the present invention can be used to obtain field angel information of the imaging device. Namely, if a normal vector to the attachment can be known, an angle of the normal vector can coincide with the field angle of the imaging device.

When measurement of the maximum dimensions is performed using the system illustrated in the block diagram in FIG. 5, in order to measure maximum dimensions in accordance with an operation by an operator, an imaging system 71 including the at least one imaging device includes a first imaging device C11 configured to obtain a first image of the take-out head 60 in such a posture that allows measurement of the maximum dimension of the take-out head 60 in the X direction and the maximum dimension of the take-out head 60 in the Z direction, a second imaging device C12 configured to obtain a second image of the take-out head 60 in such a posture that allows measurement of the maximum dimension of the take-out head 60 in the Y direction and the maximum dimension of the take-out head 60 in the Z direction, and an image display device 72 that includes a screen 73 with indicators on orthogonal coordinate axes for displaying the first image or the second image. The screen 73 with indicators on orthogonal coordinate axes is a gauge screen having two orthogonal axes (GZ-GX, GZ-GY).

In the present embodiment, an X-direction drive source 74 and an X-direction movement amount measurement unit 75 configured to move the elevating frame 59B in the X direction, a Y-direction drive source 76 and a Y-direction movement amount measurement unit 75 configured to move the elevating frame 59B in the Y direction, and a Z-direction drive source 78 and a Z-direction movement amount measurement unit 79 configured to move the elevating frame 59B in the Z direction are used. The operator performs the following operation using an operation portion 97 constituted of an operation switch etc. provided on a controller. In the following operation, image display on the screen 73 of the image display device 72 is performed by an image control section 96 in a control device 90 constituted in a control section for the apparatus 5. The computation of the maximum dimensions is performed in a dimension computation section 95 on the basis of outputs from the X-direction movement amount measurement unit 75, Y-direction movement amount measurement unit 77, and Z-direction movement amount measurement unit 79. The control device 90 includes a processor configured to implement a maximum dimension computation section 95 that constitutes the dimension measurement section. Computation of maximum dimensions is performed by the dimension computation section 95, as the dimension measurement section, on the basis of outputs from the X-direction movement amount measurement unit 75 to the Z-direction movement amount measurement unit 79. A drive control section 94 outputs an operation command for the X-direction drive source 75 to the Z-direction drive source 78 in accordance with an operation from the operation portion 97. The control device 90 further includes a teaching section 91 configured to perform an operation for teaching to be described later, a data storage section 92 configured to store teaching data, and a possibility-of-use determination section 93.

Specifically, the imaging device C1 or C2 illustrated in FIGS. 1 to 4 can be used as the first imaging device C11, if the posture of the take-out head 60 is not varied. The first imaging device C11 captures an image of the take-out head 60, as the attachment, from the front. Meanwhile, the imaging devices C6 to C8 illustrated in FIGS. 1 to 4 can be used as the second imaging device C12, if the posture of the take-out head 60 is not varied. The imaging devices C1 to C5 illustrated in FIGS. 1 to 4 can be used if the posture of the take-out head 60 is varied. The first imaging device C11 captures an image of the take-out head 60, as the attachment, from the front. The second imaging device C12 captures an image of the take-out head 60 from a side. When disposing the first and second imaging devices C11 and C12 respectively at the front and side of the take-out head 60, the method of estimating normal vectors of the present invention can be used.

Specifically, as illustrated in FIGS. 7A-7H, the direction in which orthogonal coordinate axes GZ and GX for indicators G on the screen 73 extend and the X direction and the Z direction in the first image from the first imaging device C11 are caused to coincide with each other. This state is established while seeing an image of the screen 73 and an image of the indicator G. Then, the maximum dimension in the Z direction is computed on the basis of the distance [see Zs-Ze in FIG. 6] measured by the Z-direction movement amount measurement unit 79, which is constituted of an encoder etc., during a period since a suction pad 60A, which is an outermost end portion, on one side in the Z direction, of the take-out head 60 in the first image crosses a reference line (GX in the present example) on the screen (the value measured at this time is defined as Zs) until a suction pad 60B, which is an outermost end portion, on the other side in the Z direction, of the take-out head 60 crosses the reference line (GX in the present example) (the value measured at this time is defined as Ze) [FIGS. 7A to 7D] while the take-out head 60 is moved in the Z direction by driving the Z-direction drive source 78, which is constituted of a servomotor etc.

In addition, the maximum dimension in the X direction is measured on the basis of the distance [see Xs-Xe in FIG. 6] measured by the X-direction movement amount measurement unit during a period since a suction pad 60C, which is an outermost end portion, on one side in the X direction, of the take-out head 60 in the first image crosses a reference line (GZ in the present example) on the screen (the value measured at this time is defined as Xs) until a suction pad 60D, which is an outermost end portion, on the other side in the X direction, of the take-out head 60 crosses the reference line (GZ) (the value measured at this time is defined as Xe) while the take-out head 60 is moved in the X direction by driving the X-direction drive source 74 with directions in which the orthogonal coordinate axes GZ and GY for the indicators G on the screen 73 extend coinciding with the X direction and the Z direction in the first image.

Further, as illustrated in FIGS. 8A-8E, the maximum dimension in the Y direction is measured on the basis of the distance [see Ys-Ye in FIG. 6] measured by the Y-direction movement amount measurement unit during a period since an outermost end portion 60E, on one side in the Y direction, of the take-out head 60 in the second image crosses a reference line (GZ in the present example) on the screen (the value measured at this time is defined as Ys) until an outermost end portion 60F, on the other side in the Y direction, of the take-out head 60 crosses the reference line (GZ) (the value measured at this time is defined as Ye) while the take-out head 60 is moved in the Y direction by driving the Y-direction drive source 76 with directions in which the orthogonal coordinate axes GZ and GY for the indicators G on the screen 73 extend coinciding with the Y direction and the Z direction in the second image (side image).

With the method of estimating the maximum dimensions, it is possible to measure maximum dimensions in the X direction, the Y direction, and the Z direction using simple equipment and through an easy operation. Parts mounted to the take-out head 60, which is mounted to the elevating frame 59B of the apparatus 5, are often replaced with parts different from those according to the design specifications for repair, or the arrangement posture of such parts is occasionally varied for maintenance. For example, the take-out head 60 which is mounted to the elevating frame 59B, as the work frame, is constituted with an accessory part including an air tube for providing power to the take-out head 60 or a wire. Therefore, the position and the posture of the air tube or the wire may be varied each time the take-out head 60 is replaced. The operator may mount a wrong take-out head to the elevating frame 59B. Even in such cases, a change in the shape of the take-out head 60 to be actually used can be determined, before take-out work performed using the take-out head 60 is actually started, by measuring the maximum dimensions of the take-out head 60 in the X, Y, and Z directions with the take-out head 60 mounted to the elevating frame 59B. As a result, it is possible to detect, beforehand, collision of the take-out head 60 with a part etc. located in the movement path or mounting of a wrong take-out head.

(Other Measurement Systems)

Figure 9:
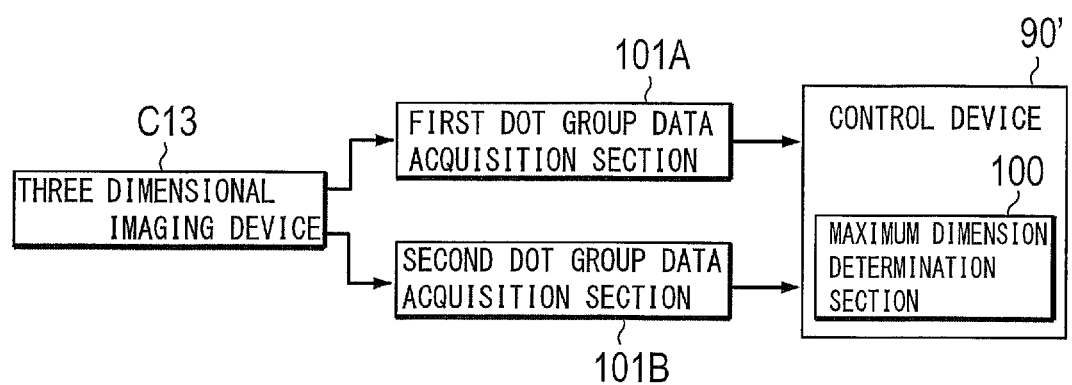
FIG. 9 is a block diagram illustrating the configuration of a measurement system that is used to measure maximum dimensions using a single three-dimensional imaging device as an imaging device.

FIG. 9 is a block diagram illustrating the configuration of a measurement system that is used to measure maximum dimensions using a single three-dimensional imaging device C13 as the imaging device. In this measurement system, maximum dimensions are measured using, as the imaging device, the three-dimensional imaging device C13 which measures an object surface to output dot group data including a large number of dots each having a three-dimensional coordinate. A first dot group data acquisition section 101A acquires, from image data obtained when the three-dimensional imaging device C13 captures an image of the take-out head 60 from the front, first dot group data that allow measurement of the maximum dimension of the take-out head 60 in the X direction and the maximum dimension of the take-out head 60 in the Z direction. Meanwhile, a second dot group data acquisition section 101B acquires, from image data obtained when the three-dimensional imaging device C13 captures an image of the take-out head 60 from a side, second dot group data that allow measurement of the maximum dimension of the take-out head 60 in the Y direction and the maximum dimension of the take-out head 60 in the Z direction. When disposing the three-dimensional imaging device C13 at the front or side of the take-out head 60, the method of estimating normal vectors of the present invention can be used. When a single three-dimensional imaging device is used, the imaging device C1 in FIG. 1 may be used as the three-dimensional imaging device, and may acquire a front image and thereafter rotate the take-out head 60 by 90 degrees using the reverse unit 59C, as the posture change device, to acquire a side image. As a matter of course, two three-dimensional imaging devices may be used to obtain a front image and a side image.

A maximum dimension determination section 100, as the dimension computation section constituted by a processor in a control device 90', measures the maximum dimension in the Z direction on the basis of the coordinate of a dot positioned at the outermost end, on one side in the Z direction, among the dots in the first dot group data, and the coordinate of a dot positioned at the outermost end, on the other side in the Z direction, among the dots in the first dot group data. The maximum dimension determination section 100 also measures the maximum dimension in the X direction on the basis of the coordinate of a dot positioned at the outermost end, on one side in the X direction, among the dots in the first dot group data, and the coordinate of a dot positioned at the outermost end, on the other side in the X direction, among the dots in the first dot group data. The maximum dimension determination section 100 further measures the maximum dimension in the Y direction on the basis of the coordinate of a dot positioned at the outermost end, on one side in the Y direction, among the dots in the second dot group data, and the coordinate of a dot positioned at the outermost end, on the other side in the Y direction, among the dots in the second dot group data.

Figure 11:
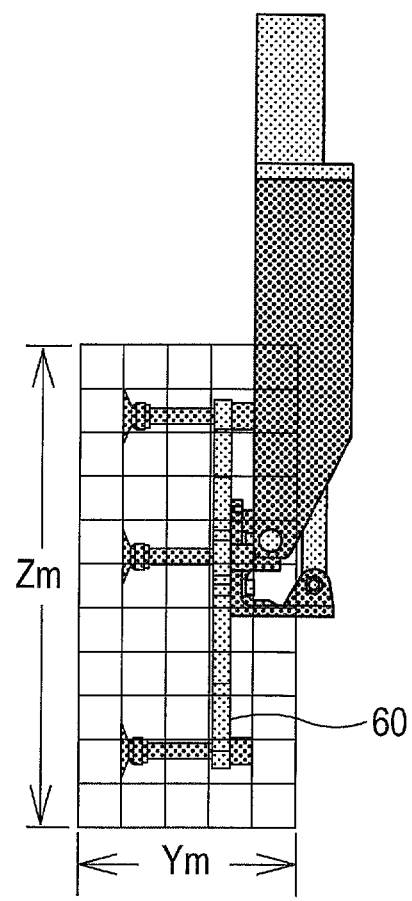
FIG. 11 illustrates a case where a maximum dimension in the Y direction is measured using dot group data.

The dot group data obtained through the three-dimensional imaging device are a data file containing, as a dot group, a large number of three-dimensional coordinates obtained by automatically measuring an object surface. That is, each dot constituting the dot group includes three-dimensional coordinate information. Thus, when an image of the take-out head 60 illustrated in FIG. 10A is captured by the three-dimensional imaging device, dot group data illustrated in FIG. 10B are obtained. Each dot includes three-dimensional coordinate information. Thus, as illustrated in FIGS. 10C and 10D, the maximum dimension determination section 100 calculates the coordinate values of a dot with the largest coordinate in the X direction and a dot with the smallest coordinate in the X direction, among dots in the dot group data at the same depth in the X direction (having the same Y coordinate value), and determines the difference between such coordinate values as a maximum dimension Xm in the X direction. In addition, the maximum dimension determination section 100 calculates the coordinate values of a dot with the largest coordinate in the Z direction and a dot with the smallest coordinate in the Z direction, among dots in the dot group data at the same depth in the Z direction (having the same Y coordinate value), and determines the difference between such coordinate values as a maximum dimension Zm in the Z direction. Next, as illustrated in FIG. 11, the maximum dimension determination section 100 calculates the coordinate values of a dot with the largest coordinate in the Y direction and a dot with the smallest coordinate in the Y direction, among dots in the dot group data acquired by the second dot group data acquisition section 101B at the same depth in the Y direction (having the same X coordinate value), and determines the difference between such coordinate values as a maximum dimension Ym in the Y direction. In this manner, the three-dimensional maximum dimensions Xm, Ym, and Zm of the take-out head 60 can be obtained from the dot group data. After the maximum dimensions are obtained, the maximum dimensions may be used as in the first embodiment. If portions with maximum dimensions are known from the characteristics of the shape of the take-out head through advance observation, as a matter of course, maximum dimensions may be calculated by obtaining coordinate values from specific dot group data in a pinpoint manner without collecting data on dots at the same depth as discussed earlier.

A known measurement technique may be used to measure maximum dimensions on the basis of images. With the above example, it is possible to minimize a measurement error due to the difference in the degree of proficiency among operators. When captured image data are used, maximum dimensions can be also measured by comparing a normal image of the take-out head (attachment) and a captured image thereof to measure maximum dimensions automatically from the difference between such images, or using AI technology which is good at image recognition. As a result, measurement can be automated.

(Estimation of Normal Vector to Attachment and Normal Vector to Die)

Figure 12:
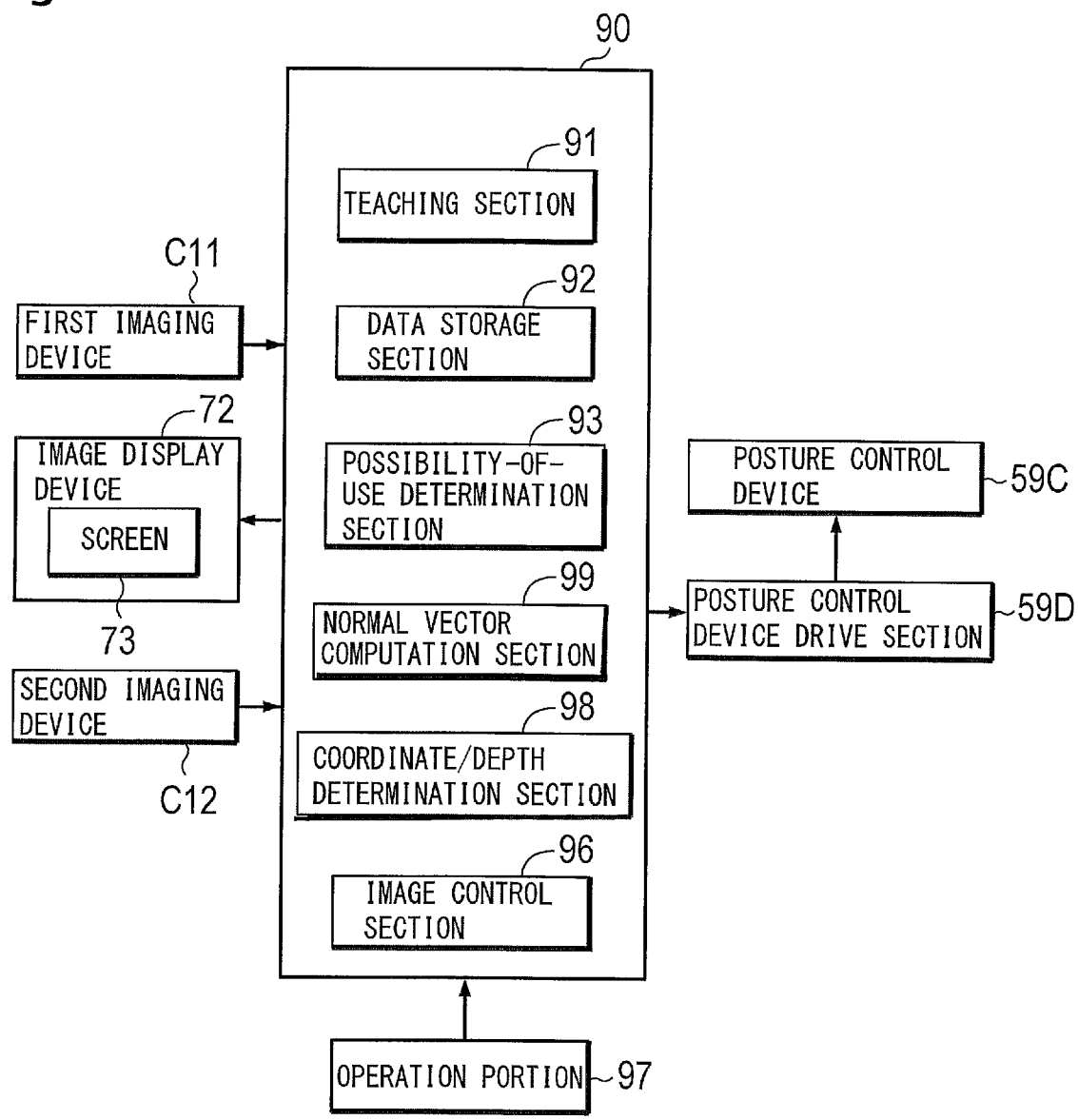
FIG. 12 is a block diagram illustrating the configuration of a normal vector estimation system that is used to apply the normal vector estimation method according to the present invention to the molded product manufacturing system.

FIG. 12 is a block diagram illustrating the configuration of a normal vector estimation system that is used to apply the normal vector estimation method according to the present invention to the molded product manufacturing system described above. In the block diagram in FIG. 12, the same constituent elements as the constituent elements in the block diagram in FIG. 5 are denoted by the same reference numerals, and elements that are not necessary to estimate normal vectors are not illustrated. In the block diagram in FIG. 12, the control device 90 includes a coordinate/depth determination section 98 and a normal vector computation section 99, and a posture control device drive section 59D configured to control the reverse unit 59C as the posture control device on the basis of the result of estimating normal vectors is illustrated. At least the coordinate/depth determination section 98 and the normal vector computation section 99 of the control device 90 are each constituted using a processor.

The normal vector estimation system estimates a normal vector to the take-out head 60 as the attachment mounted to the elevating frame 59B as the approach frame of the apparatus 5 and a normal vector to the dies 31, 32, and 34 mounted to the molding machine 3. In the present embodiment, a vector that is perpendicular to the respective mating surfaces of the fixed die 31 and the movable die (32, 34) of the die mounted to the molding machine 3 is defined as the normal vector to the die. In addition, a vector that is perpendicular to an imaginary plane that extends in a direction in which the elevating frame 59B as the approach frame extends and that is parallel to the mating surfaces when the take-out head 60 as the attachment is inserted between the fixed die 31 and the movable die (32, 34) is defined as the normal vector to the take-out head 60 as the attachment.

Figure 13:
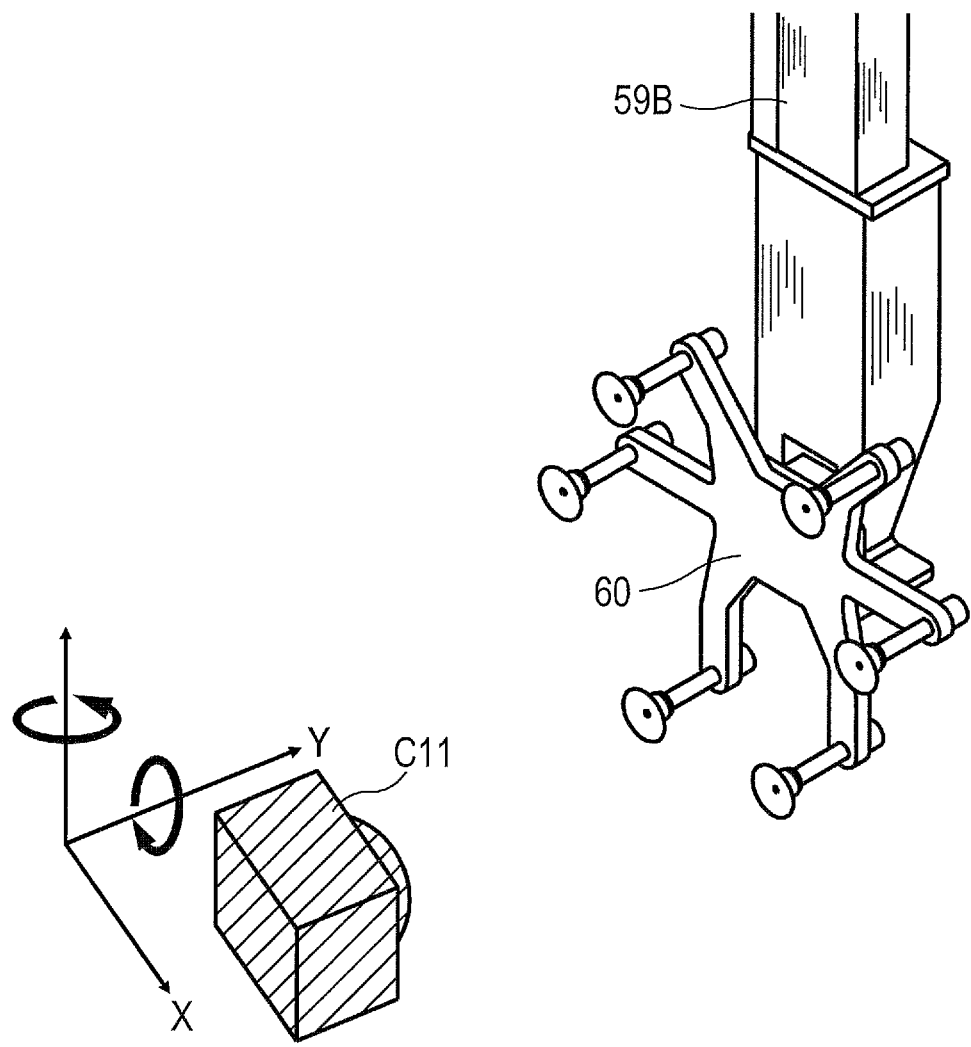
FIG. 13 illustrates an example of a method of estimating a normal vector to the take-out head.
Figure 14A:
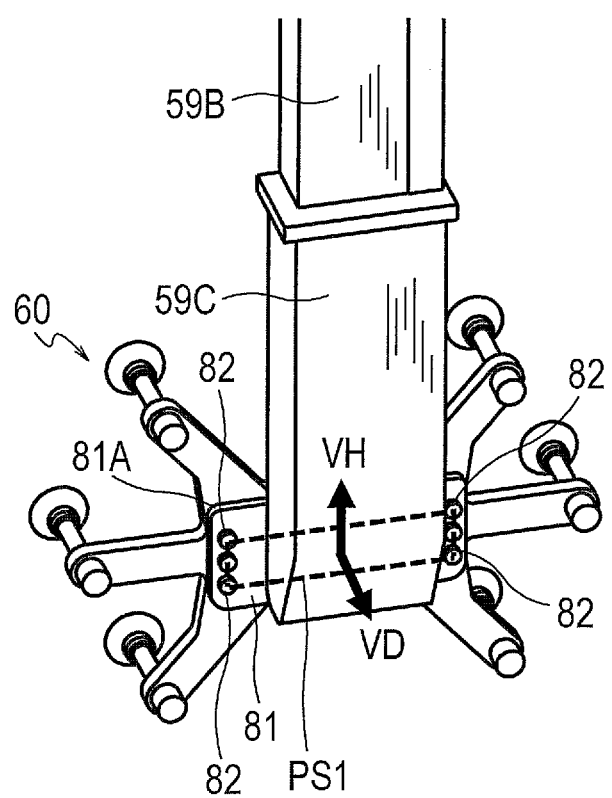
FIGS. 14A-14B illustrate an example of the method of estimating a normal vector to the take-out head.
Figure 14B:
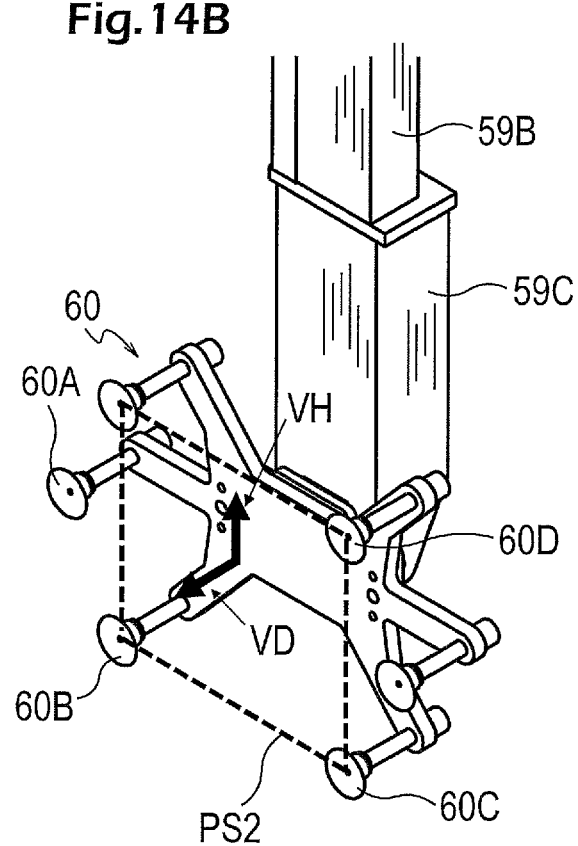

In the present embodiment, as illustrated in FIGS. 13 and 14A and 14B, an image including mounting bolts 82 as three or more mounting members or the suction pads 60A to 60D as three or more contact members is captured using an imaging device C11 (three-dimensional imaging device) capable of capturing an image including depth data or coordinate data on an object to be captured, the mounting bolts 82 extending in a direction (pull-out direction) that is orthogonal to the elevating frame 59B as the approach frame to mount the take-out head (attachment) 60 to the elevating frame 59B, and the suction pads 60A to 60D contacting the molded product. The first imaging device C11 may be the imaging device C1 or C2 illustrated in FIGS. 1 to 4. The first imaging device C11 captures an image of the take-out head 60, as the attachment, from the front or the back. Image data captured by the three-dimensional imaging device include depth data on the object to be captured.

As illustrated in FIG. 14A, the four mounting bolts 82 which are seen on the back surface of the take-out head 60 serve as the reference for mounting of the take-out head. Thus, an imaginary plane PS1 formed by connecting the four mounting bolts 82 and extending orthogonally to the four mounting bolts 82 is orthogonal to the normal vector to the take-out head 60. As illustrated in FIG. 14B, in addition, an imaginary plane PS2 formed by connecting the centers of the suction pads 60A to 60D and extending orthogonally to the suction pads 60A to 60D is orthogonal to the normal vector to the take-out head 60. In FIGS. 14A and 14B, and 15, VD denotes a normal vector in the pull-out direction, and VH denotes a normal vector in the up-down direction. The normal vector to the take-out head 60 is estimated through computation using the coordinate/depth determination section 98 and the normal vector computation section 99 on the basis of depth data or coordinate data on three of the mounting bolts 82 or three of the suction pads obtained from the image. The coordinate/depth determination section 98 acquires depth data or coordinate data on the four mounting bolts 82 or the four suction pads 60A to 60D from information (data stored in the data storage section 92) obtained from an image captured by the three-dimensional imaging device which is used as the imaging device C11. As a matter of course, these data match the specifications of the three-dimensional imaging device being used. In the present embodiment, the mounting members are the mounting bolts 82. However, the mounting members may include a mounting plate 81. If the mounting members include amounting fitting (mounting plate), a plurality of edge surfaces 81A of the mounting fitting may be considered as three or more mounting members.

Figure 15A:
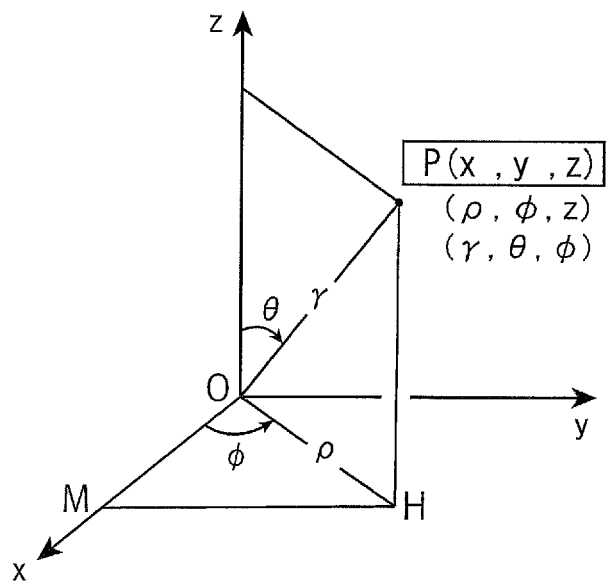
FIG. 15A illustrates depth data obtained by the three-dimensional imaging device.

The normal vector computation section 99, which is configured to include a processor, computes a normal vector according to a known method of computing a normal vector from a plane in a space. FIG. 15A illustrates the relationship between depth data and coordinate data. In FIG. 15A, a point O corresponds to the position of the three-dimensional imaging device, and a point P corresponds to a certain point on the front surface or the back surface of the take-out head, for example. In this case, the depth data refer to information on the direction (specified by angles $\theta$ and $\varphi$) of the take-out head as seen from the three-dimensional imaging device and a distance r when the point P on the take-out head is seen from the three-dimensional imaging device. The coordinate data x, y, z of the point P can be represented as $x=r\sin\theta\cos\varphi$, $y=r\sin\theta\sin\varphi$, and $z=r\cos\theta$.

Figure 15B:
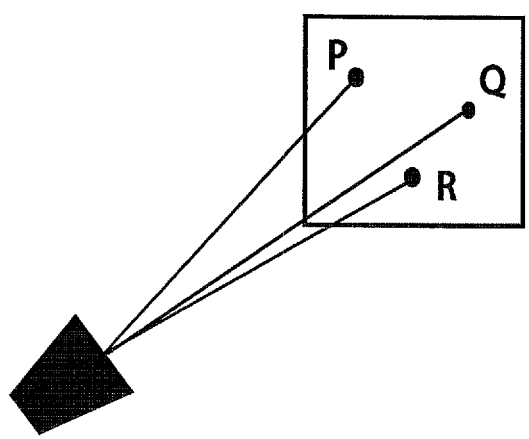
FIG. 15B illustrates that images of three points are captured by the three-dimensional imaging device.
Figure 16:
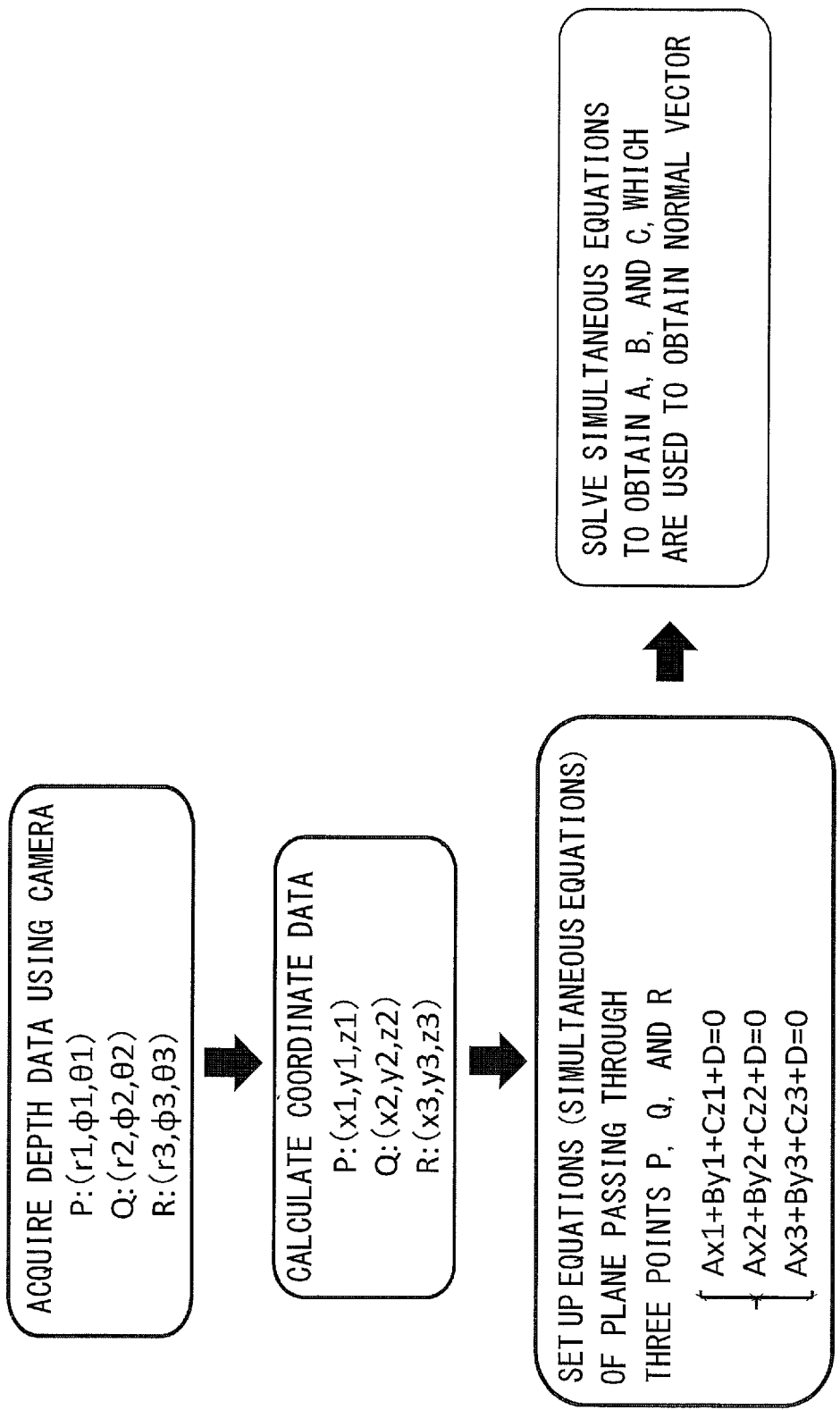
FIG. 16 is a flowchart illustrating that a normal vector is estimated through computation from depth data.

Thus, as illustrated in FIG. 15B, when coordinate data on three points P, Q, and R on the front surface of the take-out head are defined as P (x1, y1, z1), Q (x2, y2, z2), and R (x3, y3, z3), for example, the coordinate data x, y, and z on the three points can be calculated by substituting depth data P (r1, $\varphi$1, $\theta$1), Q (r2, $\varphi$2, $\theta$2), and R (r3, $\varphi$3, $\theta$3), on the points P, Q, and R, which are obtained by the three-dimensional imaging device, into the above formulas [$x=r\sin\theta\cos\varphi$, $y=r\sin\theta\sin\varphi$, $z=r\cos\theta$]. When a plane in the xyz orthogonal coordinate space is given by a plane equation $Ax+By+Cz+D=0$ where A, B, C, and D are each a real number, a normal vector n to the front surface of the take-out head is defined as $n=(A, B, C)$, and thus A, B, and C can be obtained by substituting the coordinate data on P, Q, and R into the plane equation and solve the simultaneous equations. FIG. 16 illustrates a flow of this conversion and computation.

In another method of calculating a normal vector, a normal vector a is represented by a formula $a=Ai+Bj+Ck$, where i, j, and k are base vectors along the x-axis, the y-axis, and the z-axis, respectively. A unit normal vector n with a magnitude of 1 is calculated using a formula $n=(Ai+Bj+Ck)/(A^2+B^2+C^2)^{1/2}$. A normal vector to the imaginary plane PS1 or PS2 may be calculated using this computation method. As a matter of course, other computation methods may also be used. The above computation is executed by the normal vector computation section 99.

In the present embodiment, to calculate a normal vector to the die, an image including a surrounding component located around the mating surface of the fixed die 31 or the mating surface of the movable die (32, 24) is captured using the second imaging device C12 (three-dimensional imaging device) capable of capturing an image including depth data or coordinate data. The second imaging device C12 may be at least one of the imaging devices C2 to C8, which are provided with an adjustable field angle and located as illustrated in FIGS. 1 to 4. In the present embodiment, three or more extending portions (see the guide pins 36A to 36D of the die, edge surfaces 34A of the fixed die 31 or the movable die 34, tie bars 35A to 35D, etc. in FIGS. 17 and 18) are specified from the image captured by the second imaging device as the three-dimensional imaging device, the extending portions being each a part of the fixed die 31 or the movable die (32, 34) or a part of the surrounding component and extending in a direction that coincides with the open/close direction (pull-out direction) for the fixed die 31 and the movable die (32, 34). The extending portions can be specified from an image displayed on the display 73 of the image display device 72. As discussed earlier, image data captured by the three-dimensional imaging device and stored in the data storage section 92 include depth data and coordinate data on the object to be captured, and thus the coordinate/depth determination section 98 determines depth data or coordinate data on the specified three or more extending portions. Then, the normal vector computation section 99 estimates a normal vector to the die through computation on the basis of the depth data or the coordinate data determined by the coordinate/depth determination section 98.

Figure 17:
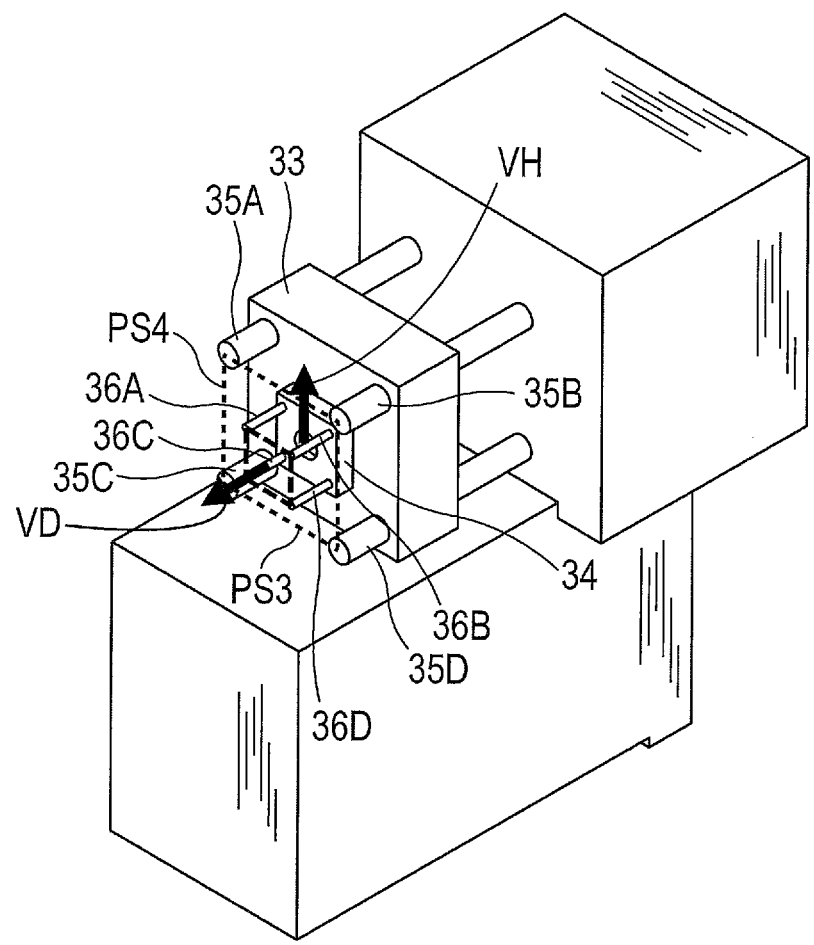
FIG. 17 illustrates an example of a method of estimating a normal vector to the die.

In the example in FIG. 17, depth data or coordinate data on the four guide pins 36A to 36D or tie bars 35A to 35D are acquired from an image, and an imaginary plane PS3 or PS4 which is orthogonal to the four guide pins 36A to 36D or tie bars 35A to 35D is calculated on the basis of such data. The guide pins 36A to 36D or the tie bars 35A to 35D are extending portions that are not varied when attaching the die, and a mating surface of the die which is mounted using the guide pins 36A to 36D or the tie bars 35A to 35D is substantially parallel to the three-dimensional imaginary plane PS3 or PS4 which is calculated using the coordinate data or the depth data on the guide pins 36A to 36D or the tie bars 35A to 35D. Thus, a normal vector to the die, namely, a normal vector VD in the pull-out direction and a normal vector VH in the up-down direction, can be calculated in this manner using the computation formula discussed earlier.

Figure 18:
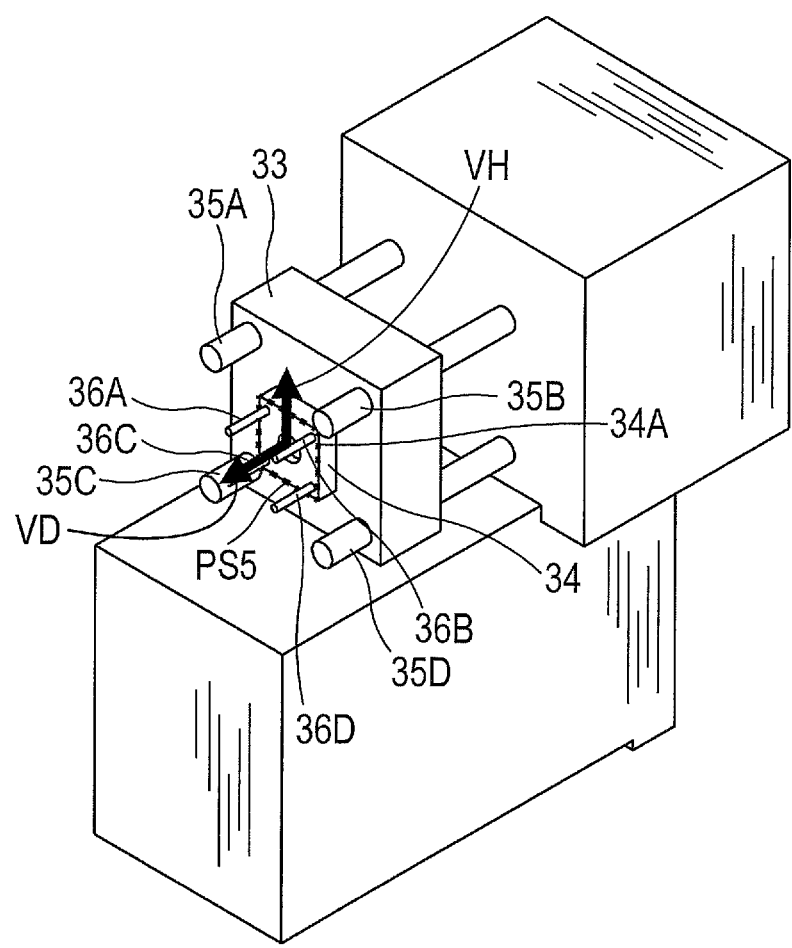
FIG. 18 illustrates an example of a method of estimating a normal vector to the die.

In the example in FIG. 18, a three-dimensional imaging device is mounted at the position of the imaging device C5 illustrated in FIG. 1, and caused to approach the die to acquire three-dimensional image data including four intersections of the edge surfaces 34A (four edges surrounding the mating surface of the die) of the movable die 34. A three-dimensional imaginary plane PS5 including the four intersections is calculated from the coordinate data or the depth data on the four intersections obtained together with the image data. The mating surface of the die is substantially parallel to the three-dimensional imaginary plane PS5. A normal vector VD in the pull-out direction and a normal vector VH in the up-down direction can be calculated from such data. In this example, a normal vector is calculated from information on portions related to the mating surface of the die, and therefore a normal vector which may be varied according to the mounting state of the die can be accurately estimated.

(Possibility of Use and Teaching)

The maximum dimensions measured as described above and the normal vectors may be used as desired. In the embodiment described above, the possibility-of-use determination section 93 determines, on the basis of information on the three-dimensional geometry of the take-out head 60, whether or not the take-out head 60 is appropriate for use in take-out work before teaching is performed by operating the teaching section 91, and outputs an alarm if the take-out head 60 is not usable. That is, it can be determined, on the basis of the maximum dimensions, whether or not the take-out head 60 can approach the die, which is open, without colliding with the die, and it can be determined, on the basis of the degree of inconsistency between the normal vector to the take-out head and the normal vector to the die, whether or not the molded product can be definitely taken out using the take-out head. That is, it is determined beforehand whether the take-out head 60 possibly collides with a surrounding object while moving, or whether the molded product cannot be definitely taken out, when teaching is executed, and an alarm is issued if there is no possibility of use of the take-out head 60.

If there is a problem with the mounting posture of the take-out head 60, the take-out head 60 may be mounted again on the basis of the alarm, or the posture of the take-out head 60 may be changed to an adequate posture by causing the reverse unit 59C as the posture control device to operate by providing a command to the posture control device drive section 59D.

INDUSTRIAL APPLICABILITY

With the present invention, image data including depth data or coordinate data obtained from the die and the attachment to be actually mounted are sampled by the imaging device to estimate a normal vector to the attachment and a normal vector to the die. Thus, normal vectors closely related to the actual mounting state of the die and the attachment can be estimated. Thus, it is possible to easily implement automation of teaching, control for the posture of the attachment, etc.

What is claimed is:

1. A method of estimating a normal vector to an attachment mounted to an approach frame of an apparatus for taking out a molded product and a normal vector to a die mounted to a molding machine, wherein a vector that is perpendicular to respective mating surfaces of a fixed die and a movable die of the die mounted to the molding machine is defined as the normal vector to the die, and a vector that is perpendicular to an imaginary plane that extends in a direction in which the approach frame extends and that is parallel to the mating surfaces when the attachment is inserted between the fixed die and the movable die is defined as the normal vector to the attachment, the method comprising:

capturing an image including a surrounding component located around the mating surface of the fixed die or the mating surface of the movable die using a first imaging device capable of capturing an image including depth data or coordinate data on an object to be captured, specifying three or more extending portions from the image, the extending portions being each a part of the fixed die or the movable die or a part of the surrounding component and extending in a direction that coincides with an open/close direction for the fixed die and the movable die, and estimating the normal vector to the die on the basis of depth data or coordinate data on the specified three or more extending portions; and capturing an image including three or more mounting members or three or more contact members using a second imaging device capable of capturing an image including depth data or coordinate data on an object to be captured, the mounting members extending in a direction that is orthogonal to the approach frame to mount the attachment to the approach frame, and the contact members contacting the molded product, and estimating the normal vector to the attachment on the basis of the depth data or the coordinate data on three of the mounting members or three of the contact members obtained from the image.

2. The method of estimating normal vectors according to claim 1, wherein
the extending portions are guide pins of the die, edge surfaces of the fixed die or the movable die, or tie bars.

3. The method of estimating normal vectors according to claim 1, wherein
the mounting members are mounting bolts or mounting fittings.

4. The method of estimating normal vectors according to claim 1, wherein
the contact members are suction pads.

5. The method of estimating normal vectors according to claim 1, wherein
the imaging devices are each a three-dimensional imaging device.

6. A method of determining a posture of an attachment when inserting the attachment into a die using the normal vector to the die and the normal vector to the attachment estimated using the method of estimating normal vectors according to claim 1, wherein the posture of the attachment is determined so as to take out a molded product in such a posture that the normal vector to the die and the normal vector to the attachment coincide with each other.

7. A method of estimating a normal vector to a die mounted to a molding machine, wherein
a vector that is perpendicular to respective mating surfaces of a fixed die and a movable die of the die mounted to the molding machine is defined as the normal vector to the die, the method comprising:
capturing an image including a surrounding component located around the mating surface of the fixed die or the mating surface of the movable die using an imaging device capable of capturing an image including depth data or coordinate data on an object to be captured, specifying three or more extending portions from the image, the extending portions being each a part of the fixed die or the movable die or a part of the surrounding component and extending in a direction that coincides with an open/close direction for the fixed die and the movable die, and estimating the normal vector to the die on the basis of the depth data or the coordinate data on the specified three or more extending portions.

8. The method of estimating a normal vector according to claim 7, wherein
the extending portions are guide pins of the die, edge surfaces of the fixed die or the movable die, or tie bars.

9. A method of estimating a normal vector to an attachment mounted to an approach frame of an apparatus for taking out a molded product, wherein
a vector that is perpendicular to an imaginary plane that extends in a direction in which the approach frame extends and that is parallel to mating surfaces when the attachment is inserted between a fixed die and a movable die is defined as the normal vector to the attachment, the method comprising:
capturing an image including three or more mounting members or three or more contact members using an imaging device capable of capturing an image including depth data or coordinate data on an object to be captured, the mounting members extending in a direction that is orthogonal to the approach frame to mount the attachment to the approach frame, and the contact members contacting the molded product, and estimating the normal vector to the attachment on the basis of the depth data or the coordinate data on three of the mounting members or three of the contact members obtained from the image.

10. The method of estimating a normal vector according to claim 9, wherein
the mounting members are mounting bolts or mounting fittings.

11. The method of estimating a normal vector according to claim 9, wherein
the contact members are suction pads.

12. A method of measuring maximum three-dimensional dimensions of an attachment using the normal vector to the attachment estimated using the method of estimating a normal vector according to claim 9 and the image from the imaging device, wherein the normal vector to the attachment is determined as a vector extending along a one-dimensional dimension of three-dimensional dimensions.

13. A system for estimating a normal vector to an attachment mounted to an approach frame of an apparatus for taking out a molded product and a normal vector to a die mounted to a molding machine, the system comprising
a processor, wherein:
a vector that is perpendicular to respective mating surfaces of a fixed die and a movable die of the die mounted to the molding machine is defined as the normal vector to the die, and a vector that is perpendicular to an imaginary plane that extends in directions in which the approach frame extends and that is parallel to the mating surfaces when the attachment is inserted between the fixed die and the movable die is defined as the normal vector to the attachment; and
the processor is configured to:
obtain depth data or coordinate data on three or more extending portions specified from an image captured using a first imaging device capable of capturing an image including depth data or coordinate data on an object to be captured, the image including a surrounding component located around the mating surface of the fixed die or the mating surface of the movable die, and the extending portions being each a part of the fixed die or the movable die or a part of the surrounding component and extending in a direction that coincides with an open/close direction for the fixed die and the movable die, and estimate the normal vector to the die on the basis of the depth data or the coordinate data, and
obtain depth data or coordinate data on three mounting members or three contact members specified from an image captured using a second imaging device capable of capturing an image including depth data or coordinate data on an object to be captured, the image including three or more mounting members or three or more contact members, the mounting members extending in a direction that is orthogonal to the approach frame to mount the attachment to the approach frame, and the contact members contacting the molded product, and estimate the normal vector to the attachment on the basis of the depth data or the coordinate data.

* * * * *